US006772141B1

(12) United States Patent
Pratt et al.

(10) Patent No.: US 6,772,141 B1
(45) Date of Patent: Aug. 3, 2004

(54) METHOD AND APPARATUS FOR ORGANIZING AND USING INDEXES UTILIZING A SEARCH DECISION TABLE

(75) Inventors: John P. Pratt, Orem, UT (US); Russell Clark Johnson, Saratoga Springs, UT (US); Ronald P. Millett, Orem, UT (US); Bruce R. Tietjen, Highland, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/460,059

(22) Filed: Dec. 14, 1999

(51) Int. Cl.[7] .............................................. G06F 17/30
(52) U.S. Cl. ...................... 707/3; 707/4; 707/7; 707/102
(58) Field of Search .............................. 707/3, 7, 102, 707/4

(56) References Cited

U.S. PATENT DOCUMENTS

| | | | |
|---|---|---|---|
| 4,620,295 A | | 10/1986 | Aiken, Jr. |
| 4,750,106 A | | 6/1988 | Aiken, Jr. |
| 5,138,711 A | * | 8/1992 | Miyoshi et al. ................ 707/1 |
| 5,204,958 A | | 4/1993 | Cheng et al. |
| 5,276,616 A | | 1/1994 | Kuga et al. |
| 5,359,729 A | * | 10/1994 | Yarnell et al. ................. 707/2 |
| 5,412,807 A | | 5/1995 | Moreland |
| 5,495,608 A | * | 2/1996 | Antoshenkov ................ 707/3 |
| 5,551,027 A | | 8/1996 | Choy et al. |
| 5,685,003 A | | 11/1997 | Peltonen et al. |
| 5,701,459 A | | 12/1997 | Millett et al. |
| 5,706,496 A | | 1/1998 | Noguchi et al. |
| 5,717,912 A | * | 2/1998 | Millett et al. .................. 707/3 |
| 5,717,921 A | | 2/1998 | Lomet et al. |
| 5,748,955 A | | 5/1998 | Smith |
| 5,761,655 A | | 6/1998 | Hoffman |
| 5,765,168 A | | 6/1998 | Burrows |
| 5,778,400 A | | 7/1998 | Tateno |
| 5,799,299 A | * | 8/1998 | Fujiwara ........................ 707/3 |
| 5,806,058 A | | 9/1998 | Mori et al. |
| 5,832,479 A | | 11/1998 | Berkowitz et al. |
| 5,848,410 A | | 12/1998 | Walls et al. |
| 5,850,522 A | | 12/1998 | Wlaschin |
| 5,852,822 A | | 12/1998 | Srinivasan et al. |
| 5,864,863 A | * | 1/1999 | Burrows ................. 707/103 R |
| 5,878,263 A | | 3/1999 | Fortin et al. |
| 5,893,104 A | | 4/1999 | Srinivasan et al. |
| 5,913,209 A | * | 6/1999 | Millett .......................... 707/3 |
| 6,185,551 B1 | * | 2/2001 | Birrell et al. .................. 707/3 |
| 6,216,123 B1 | * | 4/2001 | Robertson et al. ............. 707/3 |
| 6,421,656 B1 | * | 7/2002 | Cheng et al. .................. 707/2 |
| 2002/0035559 A1 | * | 3/2002 | Crowe et al. .................. 707/2 |

OTHER PUBLICATIONS

*An Overview of MultiText;* Charles L. A. Clarke, Gordon V. Cormack, Christopher R. Palmer, (no date).

(List continued on next page.)

*Primary Examiner*—Charles Rones
(74) *Attorney, Agent, or Firm*—Dinsmore & Shohl LLP (57) ABSTRACT

A search decision table comprises a plurality of references to indexes, such as full text indexes, where each index corresponds to one or more informational resources. The search decision table has a plurality of references to ranges of text, wherein each range of text is bound by a lower text limit and an upper text limit. Preferably, the references to ranges of text are arranged in the matrix sequentially in alphanumeric order, and each reference to a range of text comprises the lower text limit. A plurality of cross-referencing data in the matrix correlate the references to the ranges of text and the references to the indexes, wherein each of the cross-referencing data correspond to a reference to a range of text and to a reference to an index. Preferably, the matrix includes attribute data and/or index data for each reference to range of text. Other embodiments of search decision tables are also disclosed, as well different uses for the search decision table.

20 Claims, 9 Drawing Sheets

OTHER PUBLICATIONS

*An Efficient Indexing Technique for Full–Text Database Systems;* Justin Zobel, Alistair Moffat, Ron Sacks–Davis, Proceedings of the 18th VLDB Conference Vancouver, British Columbia, Canada 1992.

*Fast Incremental Indexing for Full–Text Information Retrieval;* Eric W. Brown, James P. Callan, W. Bruce Croft, Proceedings of the 20th VLDB Conference Santiago, Chile, 1994.

*Text Databases: A Survey of Text Models and Systems;* Arjan Loeffen, SIGMOD Record, vol. 23, No. 1, Mar. 1994.

*Incremental Updates of Inverted Lists for Text Document Retrieval;* Anthony Tomasic, Hector Garcia–Molina, Kurt Shoens, SIGMOD '94–5/94 Minneapolis, Minnesota, USA 1994.

*Join Queries with External Text Sources: Execution and Optimization Techniques;* Surajit Chaudhuri, Umeshwar Dayal, Tak W. Yan, Also: Department of Computer Science, Stanford Univeersity, Stanford, CA 94305, SIGMOD '95, San Jose, CA USA 1995.

*Hierarchies of Indices for Text Searching;* Ricardo Baeza–Yates, Eduardo F. Barbosa and Nivio Ziviani, (Received Aug. 17, 1994; in final revised form Aug. 2, 1996); Information Systems vol. 21, No. 6, pp 497–514, 1996.

*Self–Indexing Inverted Files for Fast Text Retrieval;* Alistair Moffat and Justin Zobel Rmit, ACM Transactions on Information Systems, vol. 14, No. 4, Oct. 1996, pp. 349–379.

*Wave–Indices: Indexing Evolving Databases;* Narayanan Shivakumar, Héctor García–Molina, SIGMOD '97 AZ, USA.

*Incremental Maintenance for Materialized Views over Semi-structured Data;* Serge Abiteboul, Jason McHugh, Michael Rys, Vasilis Vassalos, Janet L. Wiener, Proceedings of the 24th VLDB Conference New York, USA, 1998.

\* cited by examiner

| LowWord | Unique words | Total word references on creation | Total word references since creation | Queries access to this row | Index1 | Index2 | ... | IndexN |
|---|---|---|---|---|---|---|---|---|
| 00000 | 5 | 1000 | 657 | 355 | 1 | 0 | ... | 1 |
| already | 35 | 200 | 0 | 0 | 0 | 1 | ... | 1 |
| amazon | 100 | 100 | 235 | 25 | 1 | 1 | ... | 0 |
| ... | ... | ... | ... | | ... | ... | ... | ... |
| the | 1 | 22,001 | 10,356 | 0 | 1 | 1 | | 1 |
| zebra | 4 | 42 | 150 | 2 | 0 | 1 | | 0 |

| No. | Type | Word |
|---|---|---|
| 1 | 2 | television |
| 2 | 1 | television |
| 3 | 0 | television-related |
| 4 | 0 | telex |
| 5 | 2 | tell |
| 6 | 1 | tell |
| 7 | 0 | teller |
| 8 | 2 | telling |
| 9 | 1 | telling |

| No. | Frequency | Emphasis | Field Weight | Type | Word |
|---|---|---|---|---|---|
| 1 | 2 | 5 | 2 | 2 | television |
| 2 | 3 | 0 | 0 | 1 | television |
| 3 | 3 | 3 | 1 | 0 | television-related |
| 4 | 3 | 4 | 3 | 0 | telex |
| 5 | 1 | 7 | 0 | 2 | tell |
| 6 | 3 | 0 | 0 | 1 | tell |
| 7 | 3 | 0 | 0 | 0 | teller |
| 8 | 2 | 6 | 2 | 2 | telling |
| 9 | 3 | 0 | 1 | 1 | telling |

| LowWord | Index1 | Index2 | ... | IndexN |
|---------|--------|--------|-----|--------|
| 00000 | 55 | 0 | ... | 12 |
| already | 0 | 85 | ... | 79 |
| amazon | 63 | 37 | ... | 0 |
| ... | ... | ... | | ... |
| the | 95 | 98 | | 97 |
| zebra | 0 | 87 | | 0 |

| Type | Description | AI | BA | GE | LM | PW | RI | RR |
|---|---|---|---|---|---|---|---|---|
| 2 | Category: Aerospace Technology | 1 | 1 | 1 | 1 | 1 | 1 | 1 |
| 2 | Category: Airbus Industrie | 1 | 0 | 0 | 0 | 0 | 0 | 0 |
| 2 | Category: Aircraft Engines | 0 | 0 | 1 | 0 | 1 | 0 | 1 |
| 2 | Category: Aviation | 1 | 1 | 0 | 0 | 0 | 0 | 0 |
| 2 | Category: Boeing | 0 | 1 | 0 | 0 | 0 | 0 | 0 |
| 2 | Category: GE Aircraft Engines | 0 | 0 | 1 | 0 | 0 | 0 | 0 |
| 2 | Category: Lockheed-Martin | 0 | 0 | 0 | 1 | 0 | 0 | 0 |
| 2 | Category: Pratt & Whitney | 0 | 0 | 0 | 0 | 1 | 0 | 0 |
| 2 | Category: Rockwell International | 0 | 0 | 0 | 0 | 0 | 1 | 0 |
| 2 | Category: Rolls-Royce | 0 | 0 | 0 | 0 | 0 | 0 | 1 |
| 2 | Category: Spacecraft | 0 | 1 | 0 | 1 | 0 | 1 | 0 |

Fig. 9

METHOD AND APPARATUS FOR ORGANIZING AND USING INDEXES UTILIZING A SEARCH DECISION TABLE

TECHNICAL FIELD

The present invention relates generally to managing data in computer systems, and will be specifically disclosed as a method and apparatus for organizing and using indexes.

BACKGROUND

The virtual explosion of technical advances in microelectronics, digital computers and software have changed the face of modern society. In fact, these technological advances have become so important and pervasive that this explosion is sometimes referred to as "the information revolution." Through telephone lines, cables, satellite communications and the like, information and resources are ever increasingly being accessed and shared.

The introduction and wide usage of computers and networks, including the Internet, has made information increasingly accessible. A vast array of informational resources are increasingly available, including textual information (e.g. books, articles, papers, letters, e-mail, etc.), graphical information (e.g. photographs, videos, drawings, images, etc.), audio information (e.g. voices, music, audio, etc.), interactive information (e.g. Internet web sites, hyper text markup language "HTML", Java, Active X, executable programs, etc.), and the like. Informational resources can include a single type of information or a combination of two or more types of information.

As the amount of information increases, management and retrieval of that information has become an increasingly important and complex problem. One preferred way to manage and retrieve information is through indexing. Indexing is the process of cataloging informational resources in an efficient and coherent manner so that it can be easily accessed. While indexes can be used for any kind of information, indexes are often used for textual informational resources. Text refers to typographic characters, both alphanumeric and specialty characters, such as the ASCII standard, and can also include semantic and formatting information, such as bold, underline, italics, colors, size, subscript or superscript, titles, headings, abstracts, and the like.

For a given informational resource, the ability to identify the resource and retrieve data is directly related to the amount and quality of information in the index. For example, a text index may contain only the titles of the textual informational resource, or it may contain only certain key terms. In many instances, the recommended solution is to provide indexing and searching on substantially every word in a collection of texts (e.g. a full text index). A full text index is essentially an inversion of the document or data (e.g. an inverted word list), and also may contain additional semantic information about the document from the format, context or from linguistics. While full text indexes can take a variety of forms and be created using many different techniques, U.S. Pat. Nos. 5,701,459 and 5,717,912 illustrate examples of creating and using full text indexes.

One challenge in indexing is how to merge indexes together with other indexes as information changes and is added. This is often encountered with informational resources which change rapidly. Updating the indexes very often creates many small indexes, resulting in high costs in merging the indexes together or in querying many indexes at once to get a result. Waiting longer before updating the index leaves the information out of date until the next indexing and merging interval. Querying a multitude of indexes to get an answer is very costly and begins to go back towards the slow scan searching of the original documents used before indexing began to be feasible. While the whole collection of indexes can be merged into a combined index, the cost of such a merging can be substantial. Moreover, such a merger might not be possible or the best thing to do if a collection of indexes is for one site, another collection for another site, and so on.

SUMMARY OF THE INVENTION

Accordingly, an object of the invention is to provide an improved method and apparatus for organizing and using indexes. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a search decision table on a computer readable medium. The search decision table comprises a plurality of references to indexes, such as full text indexes, where each index corresponds to one or more informational resources. The search decision table has a plurality of references to ranges of text, wherein each range of text is bound by a lower text limit and an upper text limit. The references to the indexes and ranges of text are arranged in a matrix. Preferably, the references to ranges of text are sequentially arranged in alphanumeric order, and each reference to a range of text comprises the lower text limit. A plurality of cross-referencing data in the matrix correlate the references to the ranges of text and the references to the indexes, wherein each of cross-referencing data corresponds to a range of text and an index. Preferably, the matrix includes attribute data and/or index data for each range of text.

Another aspect of the present invention is a method of searching indexes on a computer system. A query is prepared comprising one or more text strings. A search decision table is accessed which cross-references ranges of text to a plurality of full text indexes. The ranges of text in the search decision table which correspond to each text string in the query are identified. The full text indexes are then determined from the search decision table, which correlate the identified ranges of text in accordance with any boolean qualifiers in the query, preferably by reading cross-referencing data corresponding to the identified ranges to text. The identified full text indexes are then searched in accordance with the query.

Still another aspect of the present invention is a computer system having a plurality of indexes, where each index corresponds to one or more informational resources. In one embodiment, indexes are organized in a hierarchial directory, such as a distributed directory. A search decision table has means for correlating the indexes with a searchable criteria, such as ranges of words, categories, phrases, and topics. Preferably, the search decision table is a matrix cross-referencing the searchable criteria to the indexes. The computer system also has a means for receiving a query and indexing the search decision table to determine indexes responsive to the query, and a means for searching the responsive indexes in accordance with the query.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers communicate between each other and share information, applications and/or services. Computers or computer systems are generally any device capable of processing data in accordance with one or more instructions. Examples of computers include personal computers, workstations, servers, mainframes, embedded systems, microprocessors, discrete logic systems, analog systems, and the like. Sometimes in the setting of interconnected computers, the various computers are referred to as nodes, which is a generic term referring to a point in a interconnected system.

Figure 1:
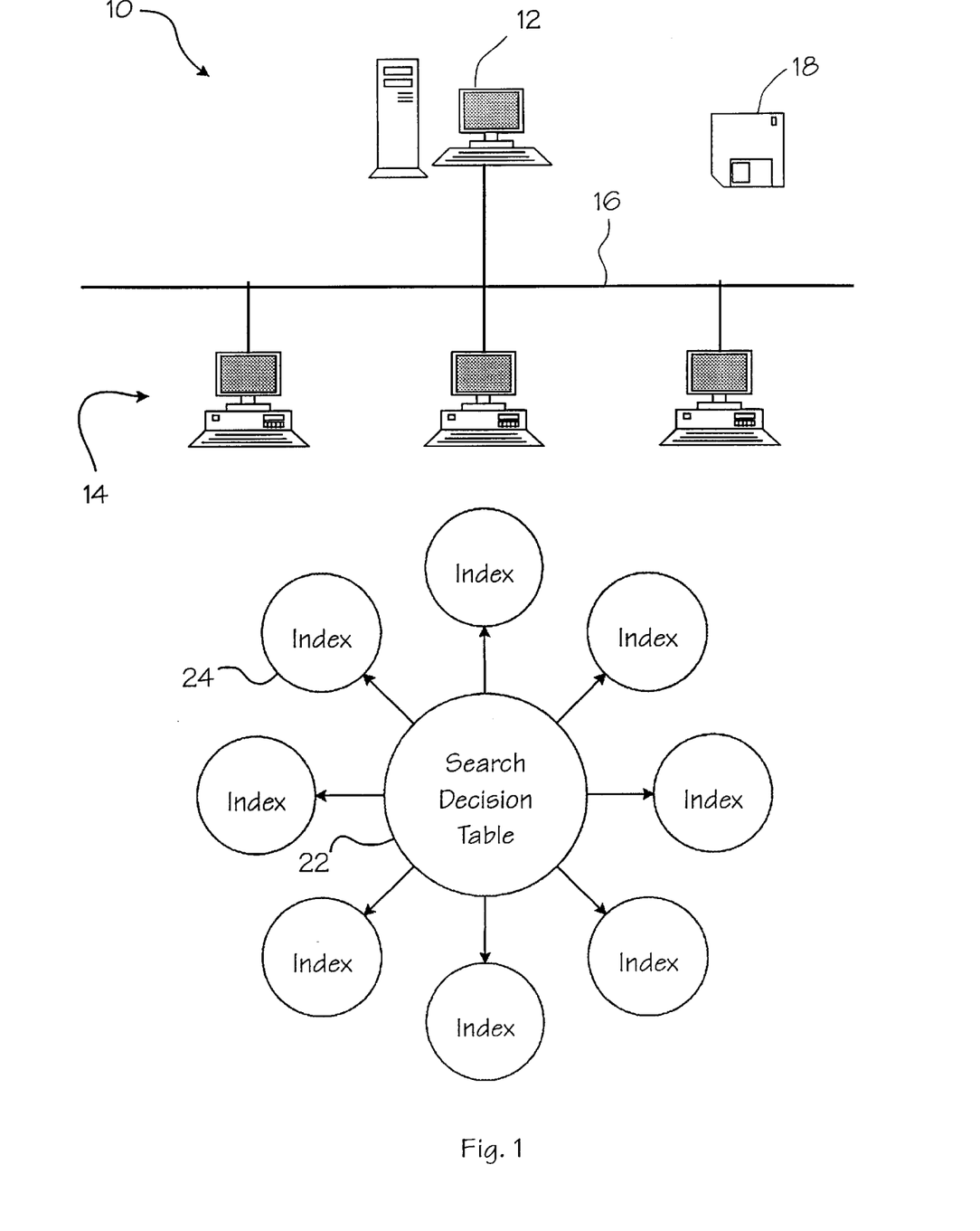
FIG. 1 depicts a computer network and a search decision table.

FIG. 1 illustrates a sample client/server network 10. As one with ordinary skill in the art will readily appreciate, a client/server network is only one type of network, and a variety of other configurations, such as local area networks, wide area networks, peer-to-peer connections, modem connections, the Internet, and the like, are also considered networks. In a client/server network, a plurality of nodes are interconnected such that the various nodes send and/or receive information to/from a server and one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Certain types of computer readable media, which are sometimes described as being nonvolatile, can retain data in the absence of power so that the information is available when power is restored.

FIG. 1 also depicts a search decision table 22 and a plurality of indexes 24. Each of the indexes 24 corresponds to one or more informational resources and provides searchable cataloging information about the respective informational resources. For textual informational resources, the various indexes 24 are preferable full text indexes, such as an inverted word list (e.g., a table referencing each unique word with its various locations in a document), and also may contain additional semantic information about the informational resource, including the format, context, linguistics, and the like. The search decision table 22 correlates the indexes 24 with a searchable criteria. Appropriate searchable criteria will vary depending upon the type of indexes. In the case of full text indexes, preferred searchable criteria include text, ranges of text, linguistic categories, topics, subjects and the like.

Figure 2:
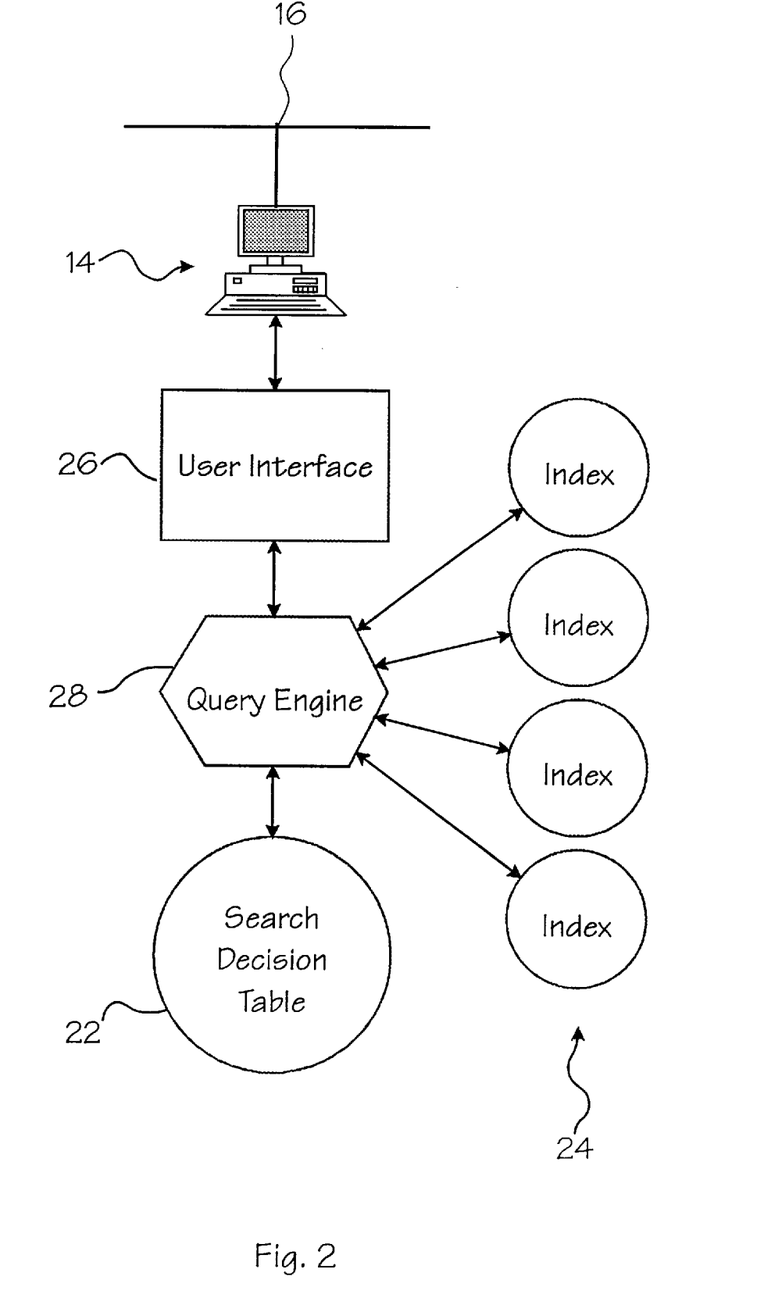
FIG. 2 illustrates a computer system using a search decision table and indexes.

FIG. 2 depicts an example of a computer system utilizing the search decision table 22. While the computer system could operate as a stand alone unit, it is preferred that the computer system participate in a network environment. As shown here, the client computer 14 is connected to the network via the connection 16. An optional user interface 26 comprises a series of instructions for the computer 14. The user interface 26 acts an intermediary or interface between a human user of the computer 14 and other programs. As shown in this example, the user interface 26 is designed to interface with the query engine 28. The query engine 28 is a program comprising a series of instructions, preferably stored on a computer readable medium. The query engine 28 can comprise a one or more program modules, files or libraries, any one of which can be located locally on the computer 10 and/or remotely on other computers via the connection 16. For the purposes of illustration, the various program modules, files or libraries of the query engine 28 are shown as a single functional program block.

The query engine 28 is operative to receive and process a variety of different types of queries or other requests for information. The query engine 28 is also operative to send and receive information to and from the search decision table 22. Upon receipt of a query and after any necessary filtering and/or manipulation, the query engine 28 accesses the search decision table 22. The query is checked against the searchable criteria in the search decision table 22 to determine the correlated indexes in accordance with the query. Once the correlated indexes are determined, the query engine 28 accesses and presents the query to such indexes 24. The results of the index searches are formatted, as may be needed, and presented to the user in the user interface 26. Accordingly, the search decision table 22 acts as a preliminary filter to identify only those indexes which may result in meaningful results. If the search extended to the entire population of the indexes, the search would be expensive and time consuming. By avoiding searches over all the indexes, less computing resources are required to respond to a search and the search response time is increased. The search decision table 22 performs as an index of the indexes 24, but does not have to be expanded with every new index 24 update. The search decision table 22 is updated when an index 24 is updated, periodically during available time periods, or at other times. The search decision table 22 can also become a semantic access table that can direct searchers to the most fruitful portion of the index space to search.

By way of illustration, the present invention can be used in conjunction with the QUICKFINDER software sold by NOVELL for textual informational resources. The current QUICKFINDER architecture uses a main index and one or more incremental index files. Index updates are merged into an incremental index. In the case where one file is indexed at a time and the index is made searchable immediately, the main index would start null and updates would be merged into the active incremental index. In such a case, a search decision table preferably is created later. Individual file or record updates are preferably merged into an incremental index file until the merge time exceeds a certain threshold. Then a new incremental update file is created and merges will go to it as the current update index. In the background, a merge task takes the non-current incremental indexes and merges them together using n-way merges into bigger indexes. The search decision table is created after a total index size in terms of unique words and total references among a minimum number of indexes exceeds another threshold value. Preferably, the search decision table correlates words or ranges of words (i.e., the searchable criteria) to the bigger indexes.

The resulting search decision table will be a fraction of the size of the total unique word list among the indexes, but nevertheless provides a good hash bucket to point queries to the right indexes to search. Because the search decision table is updated for each index added, it should be of sufficient size to limit the number of indexes that a several word search will need to query. The search decision table is preferably large enough to make the marking of new index bits not require the addition of more columns. Word ranges are demarked based on weighted values. Misspelled and other rare or "featherweight" words preferably receive a fraction of the weight in computing the table word ranges so that many of them are lumped together in a single row. For example, a featherweight word might have 1/100th the weight of a medium frequency word. Similarly, a "sumo-heavyweight" word like "the" would be forced to have its own row by itself.

Ideally, the search decision table is recomputed periodically from the individual index word lists. This could be done all at once to make a completely new search decision table or splitting individual rows based on accumulated data about that row as new indexes are added. For instance, the search decision table could be recomputed every time the indexed data doubles. An individual row would be ready to split if the number of references in it has doubled and it has been accessed by a threshold number of queries.

One variation of the invention uses a new non-merging index. The search decision table suggests an alternate way to process indexes into an incremental update file. If a search decision table is created from the beginning, then every index piece can be simply appended to the index and its entries marked in the search decision table. The resulting search decision table becomes the index into the little indexes that are preferably located in the same file.

Figure 3:
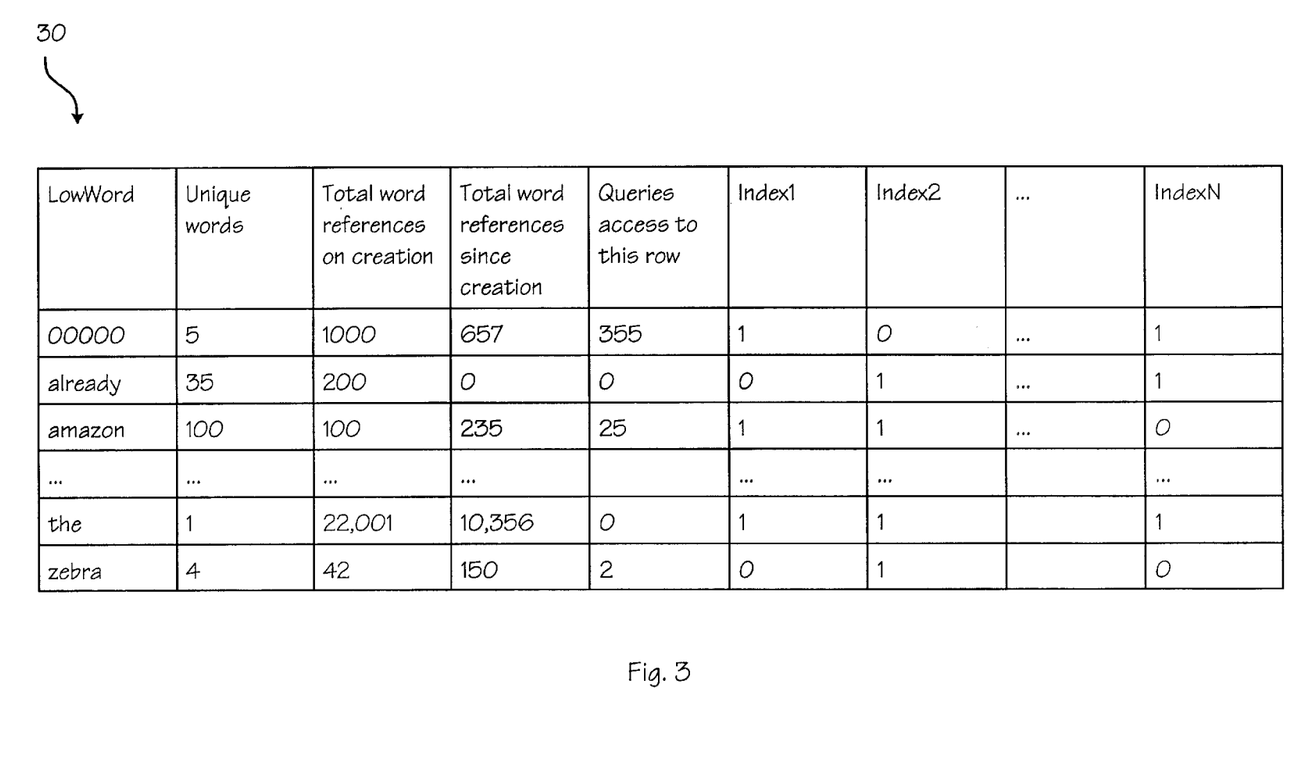
FIG. 3 illustrates an example of a search decision table.

FIG. 3 depicts one example of a search decision table 30, preferable stored on a computer readable medium, which corresponding to various full text indexes. As shown in this preferred embodiment, the search decision table 30 is organized as matrix which cross-reference the searchable criteria to the indexes. While the present embodiment depicts a two-dimensional matrix, three-dimensional or higher matrixes are also contemplated. For instance, the third or higher dimensions may represent categories, phonetics, topics and the like. The values in the first row are reserved as captions to each of the various columns. The first column represents the searchable criteria, which in this example are ranges of text. The various references to ranges of text are arranged sequentially in alphanumeric order. The first entry in each row includes a reference to a range of text, wherein each range of text is bound by a lower text limit and an upper text limit. As shown here, each reference to a range of text comprises the lower text limit. The upper text limit for each reference to a range of text is less than the next sequentially arranged lower text limit. For example, the range of text for the reference "already" is any text in alphanumeric order equal to or greater than "already" and less than "amazon." The first row reference (i.e. "00000") additionally includes any text strings less than that low word entry, and the last row references ("zebra") includes any text strings greater than that low word entry. While the present example uses a searchable criteria of ranges of words, other lexical, phonetic, topic or other semantic function of the index word list could also be used as the searchable criteria.

The sixth column and higher each correspond to a full text index. Each column caption for these rows provides a reference to a full text index (e.g., "Index1"). Cross-referencing data is provided where the rows and columns intersect. The cross-referencing data correlates the references to the ranges of text (i.e. rows) and the references to the indexes (columns six and higher), where each cross-referencing data corresponds to a reference to a range of text and to a reference to an index. In the present example, the cross-referencing data is a bit having a value of 0 or 1. A value of 1 indicates that the corresponding index contains a word in the corresponding range of text, and a value of 0 indicates that the corresponding index does not contain a word in the corresponding range of text. Accordingly, "Index1" contains one or more words within the "amazon" word range, but "Index1" does not contain a word within the "already" word range.

The second through fifth columns are index data, and provide various pieces of information for each row in the table 30. The second column identifies the number of unique words which have been identified in the various indexes for a given range of text. For instance, the range of text for "amazon" have 100 unique words identifies in the various indexes corresponding to the search decision table. The third column identifies the total word references on creation for each row in the matrix, and the fourth column identifies the total word references since creation for each row in the matrix. The fifth column lists the total query access to each row. Beyond the index data illustrated here, other index data for each row are also contemplated. The index data can be used for in a variety of applications, such as for dynamically splitting rows and in tracking the use of the table.

Figure 4:
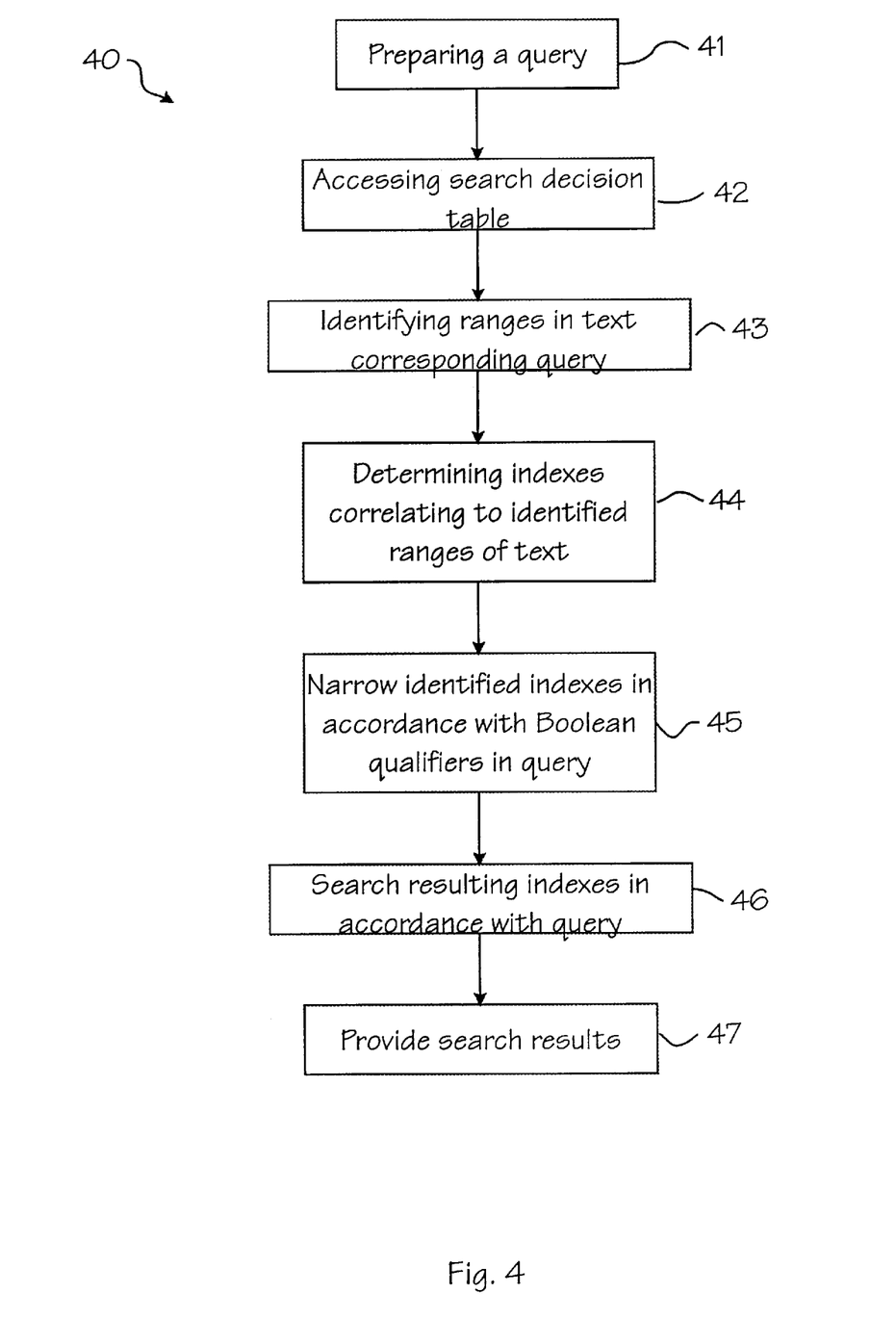
FIG. 4 depicts a flowchart of a method for using a search decision table.

FIG. 4 depicts a flowchart 40 of one way that the search decision table 30 can be used. At step 41, a query is prepared comprising one or more text strings. While the query formatting can vary widely, by way of example consider the query "aluminum /s zeppelin" (i.e. aluminum in the same sentence as zeppelin). The query is preferably parsed to determine the searchable text strings (i.e. "aluminum" and "zeppelin"). Once the searchable text strings are parsed, the search decision table 30 is accessed in step 42. At step 43, for each string of text in the query, the range of text in the first column to which the string corresponds is identified. For the text string "aluminum", the reference "already" would be identified (since in alphanumeric order "aluminum" is greater than "already" and less than "amazon"). Since the "already" row is being accessed by a query, the queries access value (i.e. fifth column) is incremented by one. Likewise, for the text string "zeppelin" the reference "zebra" is identified and the corresponding range of text, and the query access value is incremented.

At step 44, the search decision table 30 is referenced to determine the indexes which correlate to the identified ranges of text. In the present example, this step is achieved by reading the cross-referencing data in each of the identified rows. For each occurrence of the value "1", the corresponding reference to a index is added to a buffer. For instance, for the query text string "aluminum", the references "Index2" and "IndexN" correlate to the identified range of text associated with the reference "already." Likewise, the reference "Index2" is added to the buffer for range of text for "zebra." At step 45, the identified indexes in the buffer are narrowed in accordance with any boolean qualifiers in the query. Since the query requires both "aluminum" and "zeppelin", the identified indexes are compared to determine those indexes that satisfy both ranges of text (i.e. the references "already" and "zebra"). In the present case, only the reference "Index2" correlates to both ranges of text. Naturally, other boolean qualifiers may be used, including "and", "or", "not", etc., both on an individual text string basis or with cascading boolean qualifiers, and the appropriate analysis in narrowing the identified indexes should be applied.

At step 46, the identified indexes satisfying the query (i.e. "Index2") is searched in accordance with the original query, in some instances the query in its original format can be submitted (i.e. "aluminum /s zeppelin"), while in other instances the query may need to be modified to work with the index, depending upon the index being searched. At step 47, the search results from the index are returned. Accordingly, system resources are preserved and query results are provided quicker since only one index(i.e. "Index2") is searched, instead of the entire population of possible indexes.

The search decision table 30 can be created a variety of different ways. In one preferred embodiment, the table size is set at some percentage of the words in a subset of the data depending on the vocabulary size of the indexes, memory constraints of the system, and other criteria. Each row includes the low word or word prefix for the text range, optional information about the range and queries that use the range, and bit flags or index numbers indicating which indexes reference ranges in this row. Accordingly, the search decision table 30 is relatively static in number of rows for periods of time, and mainly is updated by simply setting the bits for the cross-referencing data. Preferably, the search decision table 30 is stored and managed as a database and acts as a dynamic interface for full text indexes.

Words that are duplicated in indexes for linguistic or emphasis or field information are preferably merged into a single row of the search decision table (e.g. "Meteor" vs "$_{\text{meteor}}$" in the text). The first column references in the search decision table 30 are the key field or the low word that fits into this row. The rows are keyed in the same alphabetic or binary order of the individual indexes. Preferably, a flag is used to indicate a high frequency word or "stop word" that will force its own group (e.g. "the"). Some of the index data (e.g., columns 4–5) allow for better decision making to split text ranges if its hashing value is becoming poor or for defining the text range better during a new snapshot of the indexes to make a new search decision table.

One issue is how to determine the range of words (i.e. lower text limit and an upper text limit) for each row in the search decision table 30. One embodiment uses a very simple algorithm for creating a search decision table 30 based on the frequencies of words in one or more indexes. Each word is classified as very common (e.g. greater than or equal to 1 in 256 words), common (e.g. greater than or equal to 1 in 4096 words), rare (e.g. greater than or equal to 1 in 64 k words), very rare (e.g. less than 1 in 64 k words and greater than 2), or extremely rare (1 or 2 words). Typically, extremely rare words are misspellings or unique words, such as a social security number. The first three classifications (i.e. very common, common, and rare) are provide a separate row in the search decision table 30. Ten very rare words will result in a new row, and 100 extremely rare words will result in a row. As such, the search decision table will remain a manageable and quickly searchable size.

Figure 5:
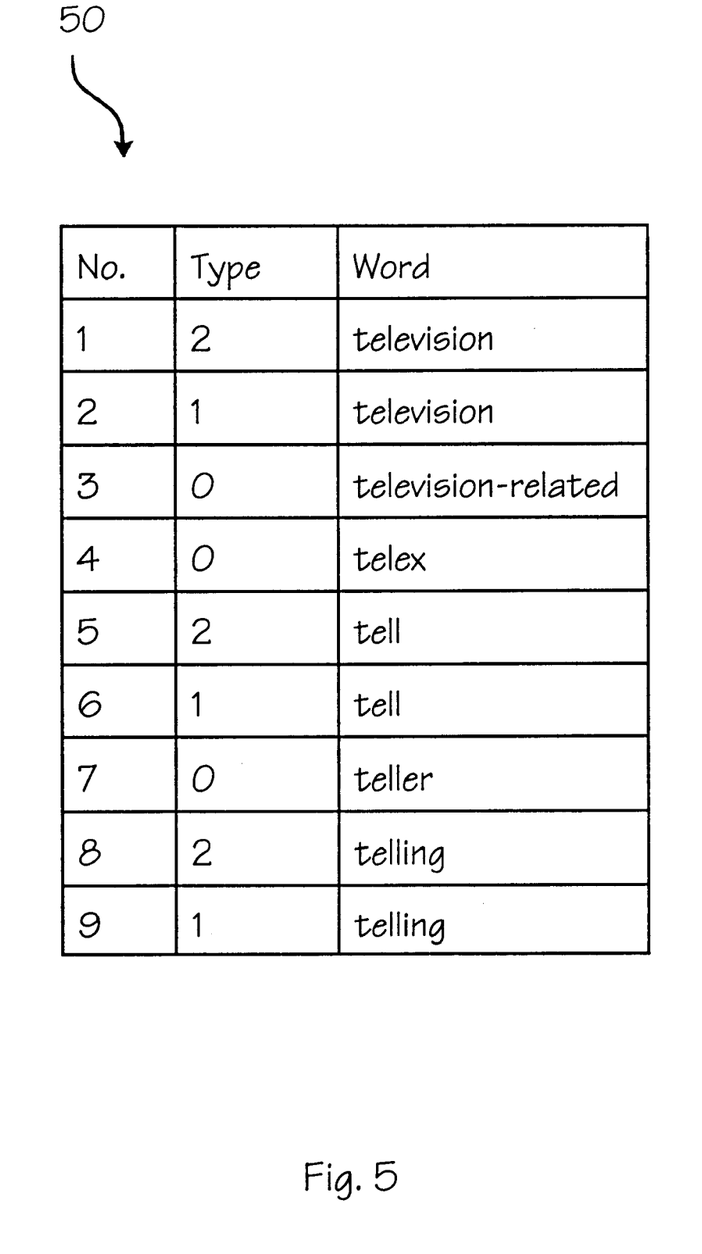
FIG. 5 illustrates an example of a search decision table.

FIG. 5 depicts an example of a search decision table segment 50. Each row is identified as one of three types (e.g. 0, 1 or 2), wherein each type is less than the following entry. Type 0 means that the text range corresponds to text greater than or equal to the text reference in that row. Type 1 means that the text range corresponds to text greater than the text reference in that row. Type 2 means that the text range corresponds to text equal to the text reference in that row (i.e. the lower text limit and an upper text limit are equal). Accordingly, a query to the table 50 for the word "television" would match row 1. A query to the table 50 for the word "television-like" would match row 2. A query to the table 50 for the word "televisions" would match row 3. A query to the table 50 for the word "telic" would match row 4.

Figure 6:
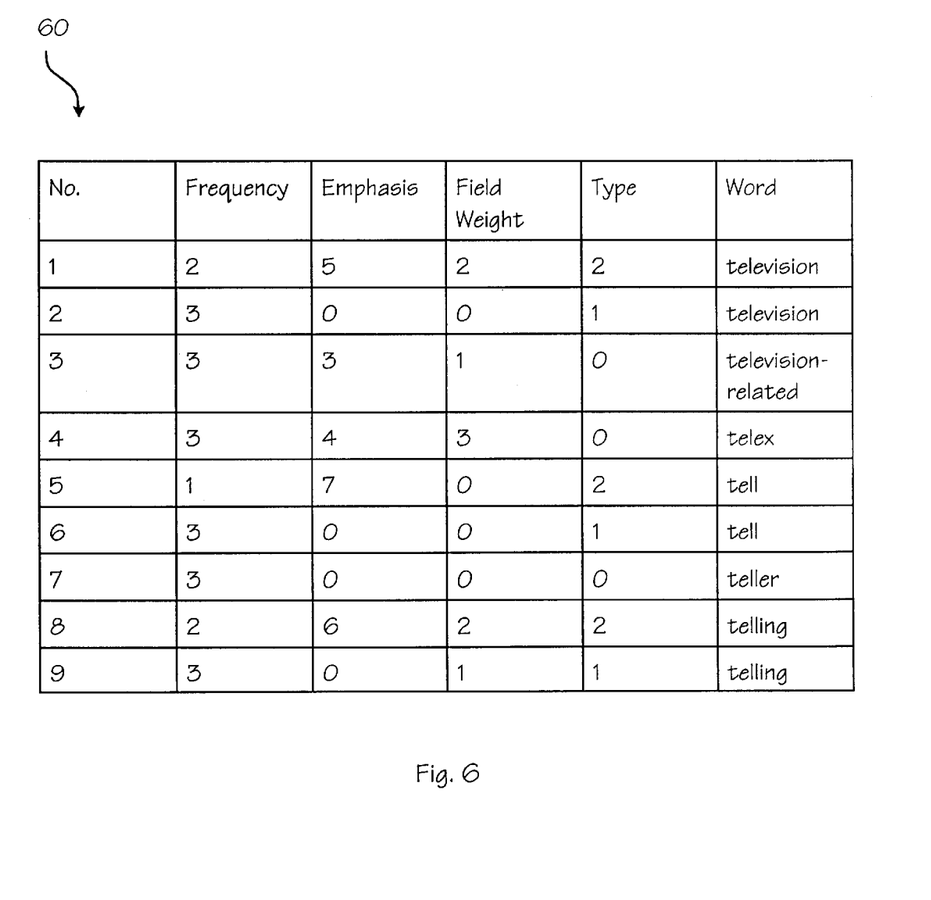
FIG. 6 illustrates attribute data in an example of a search decision table.

FIG. 6 depicts another embodiment of a search decision table 60. Attributes have been added to the rows in the search decision table 60. The attributes provide additional searching power in that the attributes indicate whether the corresponding rows came from words that were in titles of articles, bolded or emphasized in some way, or in a special metatag field. Columns 2, 3, and 4 all add examples of attribute information for the respective rows, including frequency, emphasis and field weight. These attributes are used to weight relevance values among words of a query using the search decision table. For example, in a query for "Peter the Great", "the" will have a high, frequency rating with its own row (type 2). If it gets a "50" relevance percent from one of the indexes then it will be given less weight because of these attributes when compared to "Peter" and "Great." When adding an index into the search decision table 60, if more than one word fits into a search decision table entry, then the attributes would preferably be the highest level of each type of attribute. Thus with "tell" and "tell" both matching a row, the emphasis number for row 5 would be bold level or 7.

The foregoing search decision tables offer a variety of different uses to enrich searching capabilities. One use of the search decision table includes performing analysis to determine which index a new informational resource, such as a new textual document, is most closely related. Comparing its bit pattern to the bits for other indexes weighted by the attribute bits would enable a closeness measure that could cluster this new document with another index. Clustering similar documents together will also improve the performance of the search decision table because paths to other indexes won't be as likely come from a query. The comparison algorithm between the words of the new document to be compared with the indexes would be similar to the relevance algorithm for a full text index retrieval. If a word from the document matches a row then any indexes that are marked for that row would receive a relevance boost related to the attributes of the document word and also from the attributes on the row. The index that is clustered semantically closest to the new document would have the highest relevance number.

Search decision tables can also be used for linguistic topic identification. For instance, assume twenty-five noun phrases are returned for a document in ranked order of what is perceived to be the most important topics in the document. The top five of these topics are stored in the item record in the index and index all of the topics as well as the regular full text. These topics are flagged with a special field number and give high relevance numbers to these topics. In addition to the emphasis and field weights of individual words that come from these topics, the search decision table could also contain actual topic noun phrases and subphrases. Two examples of these are the topic terms "swim wear" and "concentration camp." Each of these phrases has a specialized meaning in combination that provides a much more focused semantic search than just the individual terms of the topic phrases. For instance, when looking at a grocery store aisle, one sees the brand names and the food names, not ingredient lists and preparation directions. One sees "peanut butter" and "Tang" and "frozen dinners" and other excellent semantic category discriminator words. These topic noun phrases are preferably marked as special rows in the search decision table so they would be distinguished from words in the document. Each topic would have its own row in the search decision table similar to a high frequency word. These would also be important weighted terms in deciding which index a new document might best be clustered with. For example, a Mar. 17, 1999 ABC News article on a car powered by a hydrogen/oxygen fuel cell might have topics like: "hydro-powered cars," "fuel cell powered cars," "DimlerChrysler AG," "hydro-powered cars," "NECAR 4," and "automobile fuel systems." Putting these phrases and their combinations (e.g. index "fuel cell" as well as "fuel cell powered cars") into the index and the search decision table as a single entry adds to the semantic focus that can be obtained from the search decision table. The table is able to route the user to the appropriate index using word profiles and attributes, and/or ranked topics.

The top topic noun phrases can also be used for identifying similar documents. This will be especially true if new documents are checked in the search decision table to see where they fit best and then put in that index. For instance, if the top five topic phrases were searched, the resulting index would be a very good measure of similar documents to the new document. Initially, a user defined category tree (e.g., a hierarchial organization of topics) could be implemented with an initial base of indexed documents. However, after that start, new documents could be grouped and even split using analysis based on topic phrases. Further, an index or indexes could be split into additional indexes having similar topics, thus allowing for browsing through the index space as well as facilitating more efficient relevancy searching in an index where the topic is dominant. As these topics access the tree, better phrases could be derived on closely related terms or on superset/subset relationships. This kind of similar document search would be very fast on existing machines and be contrasted with semantic vector searches that take a super computer to compare every document vector with every other document's vector.

Figure 7:
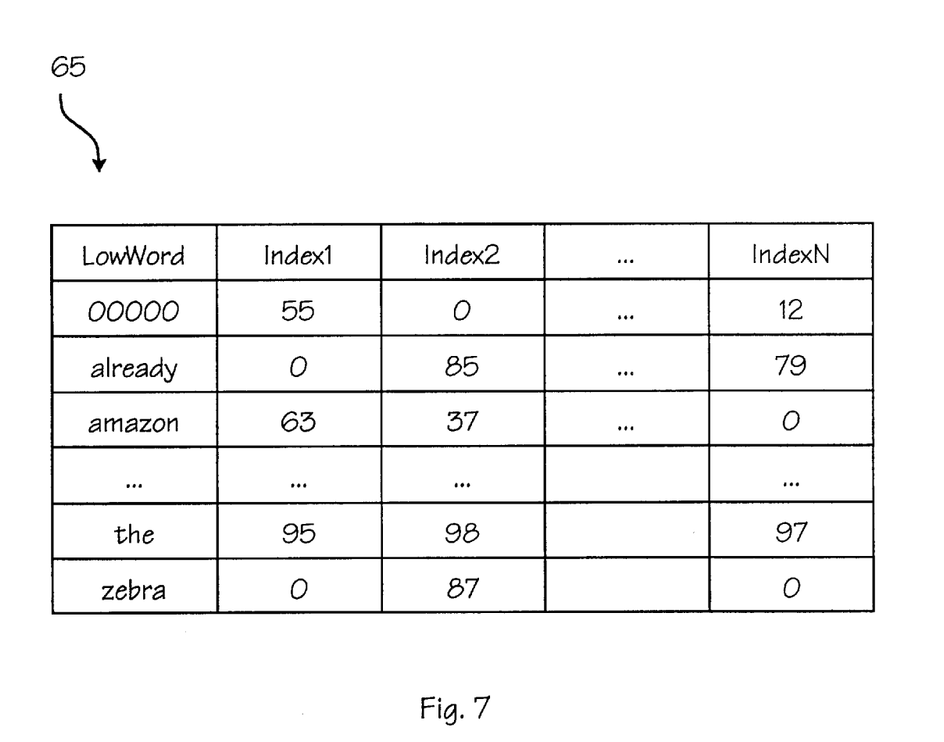
FIG. 7 illustrates an example of a search decision table having relevance values as a cross-referencing data.

In another embodiment, an example of which is illustrated in FIG. 7, the search decision table 65 has a relevance value (e.g., four bits, a percentage value, or the like) as the cross-referencing data, instead of a single bit. Just like adding attributes to the search decision table, relevant information can also be added for each index cell instead of just one bit. Thus, the addition of relevance to the cross-referencing data allows a query to search the most promising indexes first, instead of having everything create a giant equally promising breadth search. Optionally, there could be a relevance cutoff level beyond which a search would not go, thus eliminating indexes that are possible but have lower relevance.

Preferably, a relevance value is calculated and used as the cross-referencing data index in the search decision table. The relevance value represents the probability of that index containing the desired informational resource. The relevance value is calculated independent of how many indexes are in the search decision table and is not normalized. Thus, the relevance of each index remains unchanged as other indexes are added to the search decision table. The relevance value for each entry in the search decision table can be calculated in any one of a variety of ways. Consider the following four-step method for calculating relevance with textual documents.

In the first step, a single-word relevance is calculated for the word in the range as if it occurred only once in one document. Each occurrence of the word with different emphasis (such as bold or footnote) is listed as a separate word, as is each occurrence in a different field. Each such occurrence of the word is listed separately in the index. Preferably, the word relevance is determined based upon frequency of the word in the index, weight of the field containing the word, and emphasis given the word.

The second step involves modifying the relevance obtained in the first step by an algorithm using other available input parameters. These parameters include, but are not limited to: 1) the total number of hits in all the documents in the index, 2) the total number of documents containing the word in the index, 3) the maximum number of hits in any one document, and 4) the minimum number of hits in any one document.

The third step combines the relevance of all levels of emphasis and fields for one word into one combined relevance. In one embodiment, this can be done in an iterative fashion. That is, first the relevance for the first field weight and level of emphasis is calculated. Then, the next occurrence is calculated as if it were the only one, and then the result is combined with the first result. As each different occurrence is calculated, it is combined with the last combined result in a way independent of the order in which the occurrences of the same word. If there is only one word in the given row of the search decision table, then the third step completes the calculation. If there are more words included in the word range in the table, then the fourth step is implemented.

The fourth step combines the results of all the words in the range for one line of the search decision table into a single result. Parameters available to be used in this calculation include, but are not limited to the maximum frequency of the words in the range, the number of words in the range, and the number of unique words in the range.

The following example calculation illustrates one possible implementation for calculating a relevance value to be used as cross-referencing data. Suppose that the word "hurricane", is found in documents in one index as follows:

1. "Hurricane" occurs in the Title field and in bold or italics in 5 documents;
2. "Hurricane" occurs in bold or italics, but not in any field, in 27 documents; and
3. "Hurricane" occurs without emphasis and not in any field in 110 documents.

Step 1 calculates the relevance of the first occurrence (i.e., number 1, above) as if it were in a single document. In one implementation that would be:

$$Rel(1)=5\%+15\%\times Frequency+5\%\times Weight+2\%\times Emphasis,$$

where Frequency would be 3 if hurricane is a "very" rare word in the index, or 2 if only "rare." Let us suppose it is only rare. The title field is assigned a weight of 3, as is the emphasis value for bold. Thus, the single word relevance for the first occurrence is $$5\%+15\%\times 2+5\%\times 3+2\%\times 3=56\%.$$

This relevance is combined with a boost factor of 6% for 5 such hits. The new percentage is combined in such a way as never to exceed 100%. In this example, it can be simply added to make a total of 62%.

Step 2 allows for the effects of the density of the hits, that is, the number of documents containing these hits. Suppose this first occurrence of "hurricane" was in 5 documents, all of which had the word in the title, and that there were a total of 12 hits counting all the bolded forms. One simplified sample implementation might add 2% if the density of hits exceeds 2 hits per document, and 4% if it exceeds 4 hits per document, 6% if it exceeds 8 hits per document. In this case there would be an addition of 2% for a total of 64% relevance.

In order to proceed to Step 3, Steps 1 and 2 are repeated for the second and third occurrence (i.e., numbers 2 and 3, above). In the second occurrence, using the same algorithm for a frequency of 2, weight of 0 and emphasis of 3 yields 41%. If it had a total hit count in 27 documents is 32 then there is a boost of 9%, yielding a total of 50%. A sample algorithm to combine the 64% relevance for the first occurrence and the 50% for the second might be simply to combine the higher of the two relevances with a boost factor of 4% for a total of 68%. Similarly, the relevance value for the third occurrence would be 35%. If it had a total hit count of 492 occurrences in 110 documents, then it would be a boost of 12% for the total number of hits, and then another 4% because of the high density of over 4 hits per document, for a total of 51%. Combining that value with the combined total from the first two occurrences of 68% might simply add yet another 4% boost for a total relevance for the entire index of 72%. In another embodiment, the relevance values for the three occurrences (i.e., 64%, 50% and 51%) are combined all at once.

This example does not require Step 4, but a sample implementation of step 4 would be simply to treat occurrences of different words as if they were the same word, to calculate combined relevance for several words in the word range, one row in the search decision table. Since a Step 4 was not required, the combined relevance value resulting from Step 3 is added to the search decision table as cross-referencing data.

The present invention can also be used in conjunction with hierarchies of indexes or indexes stored in a distributed directory, such as NOVELL DIRECTORY SERVICES ("NDS"). As such, the search decision table can be used to coordinate distributed indexes across the Internet or an intranet. With the ever increasing growth of the Internet, the management of distributed indexes rather than global indexes becomes increasingly important in full text indexing field. Consider, for example, if the YAHOO category tree were placed into NDS to provide a hierarchy of the sites YAHOO references. If a QUICKFINDER index was created for each of those referenced sites, e.g. "Novell" or "NASA" then it would prefer to keep those indexes for each site and never merge them.

However, it is preferred to search the appropriate category sites, such as "interplanetary missile guidance systems" or some other query, without triggering a search of each of the many thousand indexes referenced in the tree. One characteristic of this kind of distributed version of the search decision table is that it would be derived from a union of all of the leaf indexes and not just from a static index with the index columns being update indexes. In the YAHOO case, this new search decision table type would be derived from the word lists of all of the individual indexes referenced by the category tree.

Figure 8:
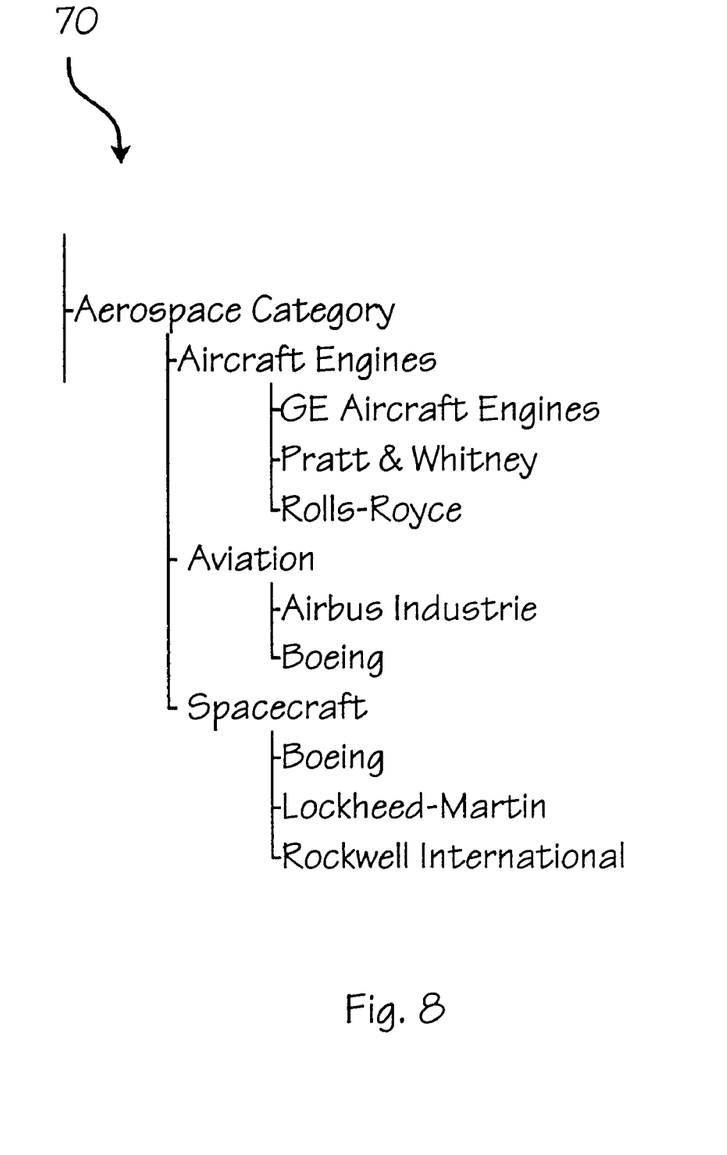
FIG. 8 depicts an example of a hierarchial organization for indexes.

Consider, for instance, the example hierarchy 70 depicted in FIG. 8. When one navigates to the region of the tree for "aerospace technology," it is preferred that the search decision table assist with the search to only those indexes in that subtree of the category tree. In one embodiment, a new searchable criteria is added to the search decision table, preferably of type 2, like "Category: Aerospace Technology", that would mark all of the indexes on or below that portion of the category tree. This would then constitute a specialized row that could be accessed along with the content query to limit the search to a more reasonable number of indexes and excluding other parts of the category tree to not be searched even though there may be pages with content that does reference the combination of the words of the query.

Figure 9:
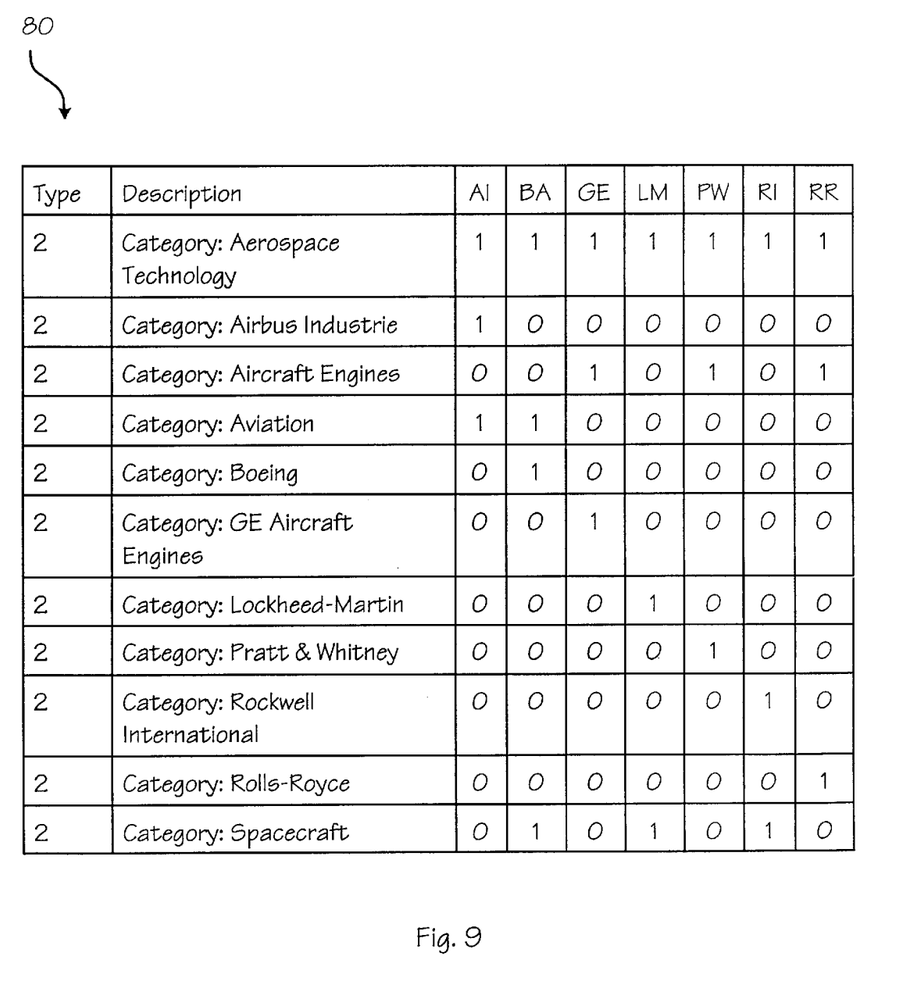
FIG. 9 illustrates an example of a search decision table using hierarchal indexes.

FIG. 9 depicts and example of a search decision table 80 which includes such specialized rows. The search decision table 80 allows for the selection of subtree segments in the directory 70 to search only those portions of the tree that are categorically appropriate to search. Note that Boeing is included in two separate categories in the directory 70. Adding category entries to the search decision table 80 would allow searches to also draw on the power of the categorization in the directory 70. In this case, searches for "space shuttle Category: Spacecraft" would search the "Boeing" and "Rockwell International" indexes but not "Bill Harwood's Space Space" (CBS Science reporter) even though there is much about the space shuttle in the science news category.

The search decision table can also be used as a semantic router switch. In other words, the search decision table can become not only a mechanism to update indexes in a manner so that they can be quickly searched online, but also be used for selecting where in the world a query should be directed for a search. As the amount of informational resources advances, effective semantic searching mechanisms become increasingly important to categorize and sift efficiently through the tarabytes and beyond sizes of information The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, the teachings of the present invention can be used for any index and is not limited to full text indexes or indexes for textual informational resources. Likewise, the invention is not limited to embodiments in QUICKFINDER, NDS or any other NOVELL product. Accordingly, this invention is intended to embrace all alternatives, modifications, and variations that fall within the spirit and broad scope of the amended claims.

We claim:

1. A method of searching indexes on a computer system, the method comprising the steps of:
    a) preparing a query comprising one or more text strings;
    b) accessing a search decision table which includes cross-referencing data having at least one bit which cross-references ranges of text to a plurality of full text indexes, each of said indexes cataloging information within one or more informational resources;
    c) identifying the ranges of text in the search decision table corresponding to each text string in the query;
    d) determining from the search decision table which of the plurality of the full text indexes correlate to the identified ranges of text in accordance with any boolean qualifiers in the query; and
    e) searching the identified full text indexes in accordance with the query.

2. The method of claim 1, wherein the step of determining comprises reading cross-referencing data corresponding to the identified ranges of text.

3. A computer system, comprising:
    a) a plurality of indexes, each of said indexes cataloging one or more informational resources;
    b) a search decision table having relevance values for correlating the plurality of indexes with searchable criteria, wherein each of said relevance values corresponds to a reference to at least one of the searchable criteria and to a reference to an index of said plurality of indexes, wherein each relevance value represents the probability of an index containing the at least one searchable criteria;
    c) means for receiving a query and indexing the search decision table to determine which of the plurality of indexes are responsive to the query by identifying searchable criteria in the search decision table corresponding to searchable criteria in the query and by using the relevance values to determine from the search decision table which of the plurality of indexes correlate to the identified searchable criteria; and
    d) means for searching the responsive indexes in accordance with the query;
    wherein each of the plurality of indexes are configured to be updated at a time prior to the updating of the search decision table, and the search decision table is configured to be updated during available times following the updating of one or more of the plurality of indexes.

4. The computer system of claim 3, further comprising a hierarchical directory within which the plurality of indexes are organized.

5. The computer system of claim 3, wherein the hierarchical directory is a distributed directory.

6. The computer system of claim 3, wherein the searchable criteria are selected from the group consisting of ranges of words, categories, phrases, and topics.

7. The computer system of claim 3, further comprising means for using the search decision table.

8. The computer system of claim 3, wherein the search decision table is a matrix cross-referencing the searchable criteria to the indexes.

9. A search decision table on a computer readable medium, the search decision table comprising:
    a) a plurality of references to indexes, each index corresponding to a plurality of informational resources and each index providing cataloging information about the respective informational resources;
    b) a plurality of references to ranges of text, wherein each range of text is bound by a lower text limit and an upper text limit;
    c) a matrix within which the references to the indexes and ranges of text are arranged;
    d) a plurality of cross-referencing data in the matrix correlating the references to the ranges of text and the references to the indexes, each of said cross-referencing data corresponding to a reference to a range of text and to a reference to an index;
    e) index data in the matrix corresponding to each reference to a range of text, the index data comprising one or more of the following: number of unique words which have been identified in the various indexes for each range of text, total word references in the indexes for the each range of text, and number of queries for each range of text; and
    f) means for grouping documents among the various indexes.

10. The search decision table of claim 9, wherein the indexes are full text indexes.

11. The search decision table of claim 9, wherein the references to ranges of text are arranged in the matrix sequentially in alphanumeric order.

12. The search decision table of claim 11, wherein each reference to a range of text comprises the lower text limit.

13. The search decision table of claim 12, wherein the upper text limit for each reference to a range of text is less than the next sequentially arranged lower text limit.

14. The search decision table of claim 9, wherein the cross-referencing data is one bit.

15. The search decision table of claim 14, wherein a cross-referencing data equal to 1 indicates that the corresponding index contains a word in the corresponding range of text, and a cross-referencing data equal to 0 indicates that the corresponding index does not contain a word in the corresponding range of text.

16. The search decision table of claim 9, wherein the cross-referencing data is a value indicating the relevance of the corresponding text range to the corresponding index.

17. The search decision table of claim 9, further comprising means for calculating the relevance value.

18. The search decision table of claim 9, further comprising attribute data for each reference to range of text.

19. The search decision table of claim 9, further comprising means for using the matrix.

20. The search decision table of claim 9, further comprising means for creating the matrix.

* * * * *